United States Patent [19]

Brinkmann et al.

[11] 4,235,311
[45] Nov. 25, 1980

[54] MECHANISM FOR ADJUSTING THE AIR GAP BETWEEN THE COMPONENTS OF AN ELECTROMAGNETIC BRAKE

[75] Inventors: Karl E. Brinkmann, Dörentrup; Bernd L. Assmann, Barntrup, both of Fed. Rep. of Germany

[73] Assignee: K. Ernst Brinkmann, Industrieverwaltung, Barntrup, Fed. Rep. of Germany

[21] Appl. No.: 952,537

[22] Filed: Oct. 18, 1978

[30] Foreign Application Priority Data

Oct. 22, 1977 [DE] Fed. Rep. of Germany ....... 2747466

[51] Int. Cl.³ ............................................. F16D 63/00
[52] U.S. Cl. .................. 188/71.7; 188/72.3; 188/161; 188/163
[58] Field of Search .............. 188/71.7, 163, 161, 188/196 V, 196 M, 72.3, 216; 310/77

[56] References Cited

U.S. PATENT DOCUMENTS

| | | | |
|---|---|---|---|
| 2,181,988 | 12/1939 | Davis | 188/71.7 X |
| 3,024,873 | 3/1962 | Wilkinson | 188/196 M X |
| 3,425,519 | 2/1969 | Frigger | 188/196 V X |
| 3,446,322 | 5/1969 | Wrensch | 188/163 X |

*Primary Examiner*—Douglas C. Butler
*Attorney, Agent, or Firm*—Peter K. Kontler

[57] ABSTRACT

An electromagnetic brake wherein a first component is non-rotatably secured to a shaft or another rotary member and a second component of the brake is non-rotatably secured to a stationary part with freedom of movement in the axial direction of the first component. The second component contains a solenoid which is energizable to attract a friction generating liner of the second component against a disk of the first component and to thus arrest the first component. The width of the air gap between the first and second components can be adjusted by screws which extend radially of the first component or in parallelism with the axis of the first component and mesh with the stationary part. The conical or rounded tips of the screws can shift the second component toward the first component to reduce the width of the air gap. A polygonal array of leaf springs couples the second component to the stationary part and tends to move the second component axially of and away from the first component.

11 Claims, 4 Drawing Figures

MECHANISM FOR ADJUSTING THE AIR GAP BETWEEN THE COMPONENTS OF AN ELECTROMAGNETIC BRAKE

CROSS-REFERENCE TO RELATED APPLICATION

Certain features of the electromagnetic brake which embodies the present invention are described in the commonly owned copending application Ser. No. 952,538 filed by Brinkmann et al. on Oct. 18, 1978 for "Electromagnetic Brake".

BACKGROUND OF THE INVENTION

The present invention relates to electromagnetic brakes in general, and more particularly to improvements in electromagnetic brakes of the type wherein a first component or armature of the brake is secured to a rotary member (e.g., to the shaft of a motor, engine or another machine) and a second component of the brake is non-rotatably secured to a stationary member (such as a wall, bearing plate or an analogous part of a motor, engine or another machine). Still more particularly, the invention relates to improvements in electromagnetic brakes of the type wherein the second component of the brake comprises one or more solenoids which are energizable to establish and electromagnetic field serving to effect engagement or disengagement of the two components.

In heretofore known electromagnetic brakes of the above outlined character, the second component (including the solenoid(s)) is affixed to a stationary member in such a way that it is held against any movement, i.e., against angular movement as well as against movement in the axial direction of the first component. The first component shares the angular movements of the rotary member and is movable axially of the rotary member, i.e., toward the second component when the latter is caused to or is free to attract the first component. As a rule, the connection between the first component and the rotary member includes one or more springs which bias the first component axially and away from the second component. In other words, rotation of the first component (and of the rotary member, such as a shaft) can take place when the spring or springs are free to move the first component axially of the rotary member and away from the fixedly mounted second component of the brake.

The width of the customary air gap which is provided between the first component and the friction generating liner of the second component in disengaged condition of the brake varies as the wear upon the parts of the brake (especially upon the liner) progresses. The liner is mounted in the second component and frictionally engages a portion of the first component when the brake is operative, i.e. when the electromagnetic field is free to overcome the bias of the aforementioned spring or springs in order to maintain the two components of the brake in actual contact with each other. The effectiveness of the brake decreases as the width of the air gap increases; therefore, it is necessary to adjust the brake from time to time so as to reduce the width of the gap to an acceptable value, for example, by replacing a worn friction generating liner with a fresh liner. In most instances, the width of the air gap is reduced by shifting the first component of the brake axially of the rotary member in a direction toward the second component, i.e., toward the friction generating liner. Such operation is time-consuming and must be carried out by skilled attendants because it is necessary to dismantle the entire brake as well as a portion of the machine in which the brake is installed in order to gain access to the first component to an extent such as is necessary to enable the attendant or attendants to change the axial position of the first component with respect to the rotary member. As a first step, the attendant or attendants must remove the customary protective shield or housing for the brake in order to gain access to the first (rotary) component. The entire operation takes up inordinately large amounts of time, which unduly affects the output of the machine wherein the brake is put to use.

The situation is further aggravated if the electromagnetic brake is combined with an electromagnetic clutch. Such combinations are used in many machines. If the width of the air gap requires adjustment (as a rule, the adjustment involves a reduction of the width of the air gap), the clutch must be dismantled and removed before the attendants can gain access to the protective housing of or directly to the electromagnetic brake, especially to the axially movable first component of the brake. Upon completion of adjustment, the protective housing must be reinstalled prior to reassembly of the clutch with the adjusted brake. Moreover, and since the clutch also defines an air gap whose width is a function of the width of the air gap between the two components of the brake, each adjustment of the air gap in the brake necessitates a corresponding adjustment of the air gap in the clutch. These operations are time-consuming, even more so than if the electromagnetic brake is used alone, i.e., not in combination with an electromagnetic clutch.

OBJECTS AND SUMMARY OF THE INVENTION

An object of the invention is to provide an electromagnetic brake which is constructed and assembled in such a way that the width of the air gap between its components can be adjusted with little loss in time.

Another object of the invention is to provide an electromagnetic brake wherein the adjustment of the width of the air gap is simpler and requires less skill than in heretofore known brakes.

A further object of the invention is to provide an electromagnetic brake wherein the component which includes the solenoid(s) is constructed, assembled and mounted in a novel and improved way.

An additional object of the invention is to provide an electromagnetic brake wherein the width of the air gap can be adjusted with little loss in time regardless of whether or not the brake is combined with an electromagnetic clutch.

Another object of the invention is to provide the electromagnetic brake with novel and improved means for adjusting the width of the air gap between the rotary and non-rotating components.

The invention is embodied in a device for braking a first member which is rotatable with respect to a stationary second member, particularly for braking a shaft which is rotatable with respect to a stationary part of a machine (the term "machine" is intended to embrace motors and/or engines). The braking device comprises a first component, one or more keys or analogous means for securing the first component to the first member so that the first component shares all angular movements of the first member, a second component which is adjacent the first component and defines therewith an air gap when the device is disengaged, a polygonal array of leaf springs or other suitable means for coupling the second component to the second member with freedom of movement in the axial direction of the first component, and a set of wedges, screws or other suitable means for adjusting the position of the second component with respect to the second member in the axial direction of the first component to thereby vary the width of the air gap between the first and second components. The adjusting means is accessible at the exterior of the second member so that the width of the air gap can be changed without any or upon only minimal dismantling of the device.

The aforementioned coupling means is preferably designed to bias the second component away from the first component, and the adjusting means comprises means for moving the second component toward the first component against the opposition of the biasing means. In accordance with one presently preferred embodiment of the invention, the adjusting means comprises several (e.g., four equidistant) adjusting members mounted in the second member for movement substantially radially or axially of the first component and having cam faces or otherwise configured portions which engage the second component, for example, in response to rotation of the adjusting members if the adjusting members are provided with external threads and mesh with the second member.

The second component of the device comprises one or more solenoids which are energizable to establish an electromagnetic field which causes the second component to move axially of and to engage and brake the first component (together with the first member).

The novel features which are considered as characteristic of the invention are set forth in particular in the appended claims. The improved brake itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
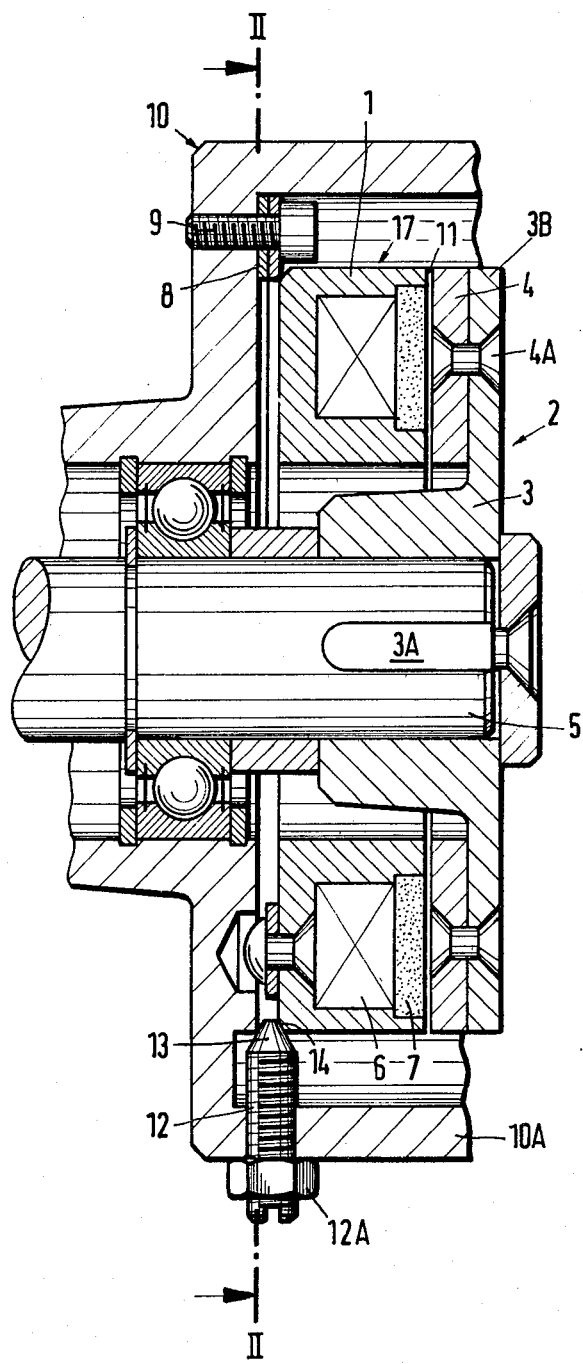
FIG. 1 is an axial sectional view of an electromagnetic brake which embodies one form of the invention, the section being taken along the line I—I of FIG. 2, as seen in the direction of arrows.
Figure 2:
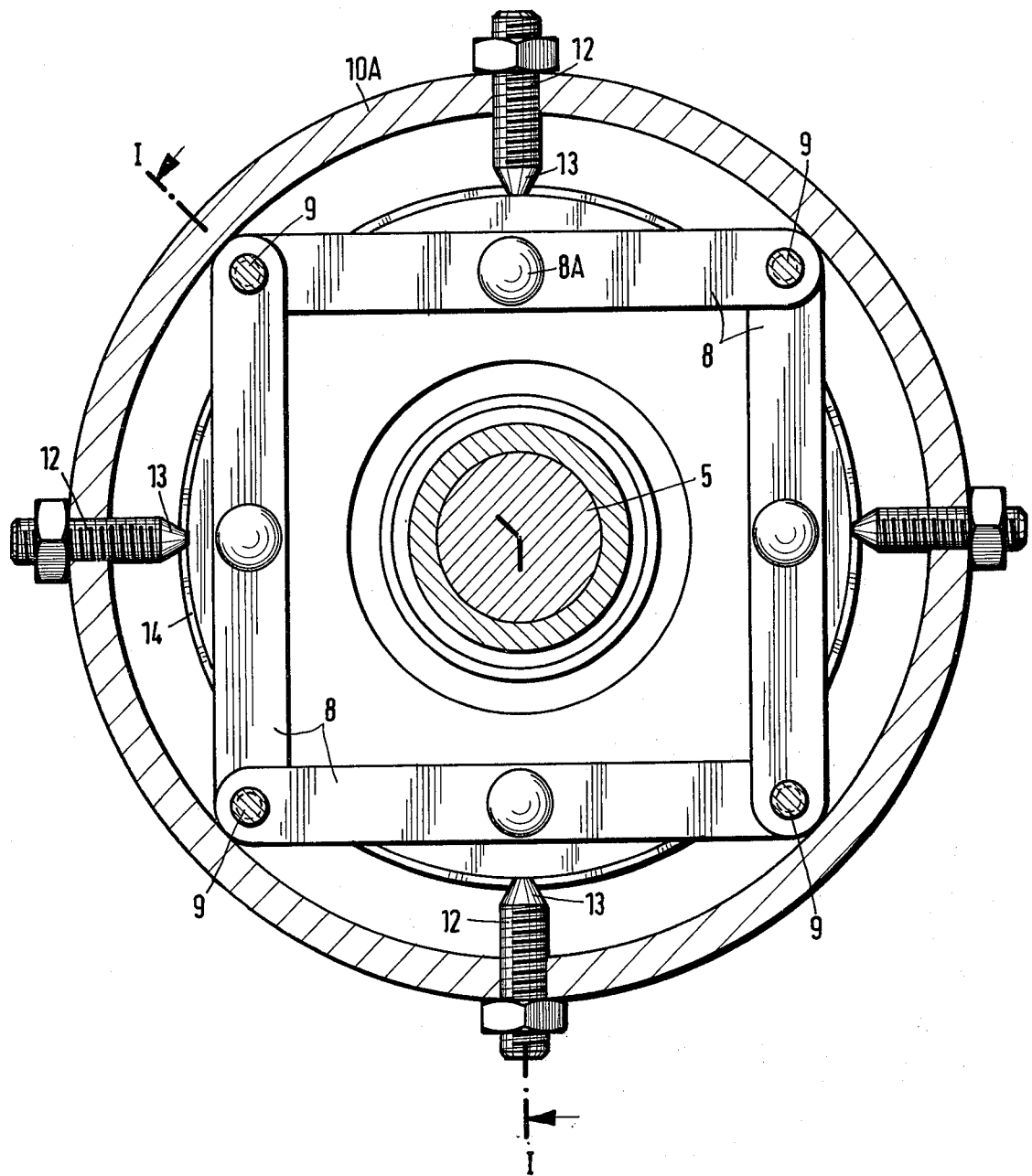
FIG. 2 is a sectional view as seen in the direction of arrows from the line II—II of FIG. 1.

Referring first to FIGS. 1 and 2, there is shown an electromagnetic brake which comprises a first component or armature 2 having a hub 3 fixedly secured to a rotary member 5 by one or more keys 3A or the like in such a way that the component 2 shares all angular movements of the member 5 and cannot move axially with respect thereto. The rotary member 5 may constitute the shaft of a motor, engine or another machine. A second component 17 of the brake is non-rotatably secured to a stationary member 10 which may constitute a wall or a bearing plate in a motor, engine or another machine. The mounting of the component 17 is such that the latter is movable, within limits, axially of the first component 2 and of the rotary member 5. A flange 3B of the hub 3 of the rotary component 2 supports a washer-like disk 4 which consists of magnetizable material and is secured to the flange 3B by rivets 4A or analogous fasteners.

The second component 17 of the brake comprises a casing or support 1 for a solenoid 6 and a friction generating liner 7 which is adjacent to the disk 4 of the component 2. The means for coupling the component 17 to the member 10 with freedom of movement in the axial direction of the rotary member 5 and of the first component 2 comprises a polygonal array of elongated straight leaf springs 8 best shown in FIG. 2. The median portions of the leaf springs 8 are secured to the support 1 by rivets 8A and the overlapping end portions of neighboring springs 8 have registering holes for screws 9 or analogous fasteners which secure the end portions to the member 10. Such construction enables the component 17 to move axially of the component 2, and the springs 8 tend to move the component 17 away from the component 2. When the solenoid 6 is energized, it establishes a closed electromagnetic field whose field lines pass through the disk 4 and the support 1 and which overcomes the bias of the springs 8 to move the liner 7 into frictional engagement with the disk 4 to thus arrest the rotary member 5 and the component 2. In the embodiment of FIGS. 1 and 2, the leaf springs 8 form a square whose center is on the axis of the rotary member 5. The rivets 8A and the screws 9 insure that the polygonal array of springs 8 (and hence the component 17) cannot turn about the axis of the rotary member 5.

When the solenoid 6 is energized in a manner not forming pat of the present invention, the median portions of the springs 8 are flexed and allow the component 17 to move toward the component 2 whereby the disk 4 cooperates with the liner 7 to reduce the width of an air gap 11 to zero. The effectiveness of the brake depends on the width of the air gap 11; such width depends, in turn, on the wear upon the liner 7 (and, to a certain extent, on the wear upon the adjacent side of the disk 4). In order to reduce the width of the air gap 11 in response to pronounced or noticeable wear upon the liner 7, the brake comprises means for adjusting such width by moving the component 17 axially of and toward the component 2 against the opposition of the leaf springs 8. In the embodiment of FIGS. 1 and 2, the adjusting means comprises several equidistant adjusting members in the form of screws 12 which mesh with a cylindrical collar 10A of the member 10 and extend substantially or exactly radially of the support 1. Conical tips 13 of the screws 12 engage a bevelled edge face 14 at the rear side of the support 1, namely, at that side or surface of the support 1 which faces away from the air gap 11. The inclination of the edge face 14 preferably matches the inclination of conical surfaces or cam faces of the tips 13 of the adjusting screws 12. Each screw 12 can be fixed in any selected axial position by a lock nut 12A which is outwardly adjacent to the collar 10A. The axial positions of the screws 12 determine the maximum width of the air gap 11, i.e., an operator can reduce the width of the air gap 11 by the simple expedient of rotating the screws 12 in a direction to move their tips 13 toward the common axis of the rotary member 5 and of the component 2.

An important advantage of the improved brake is that the width of the air gap 11 can be altered without any or with minimal dismantling of the brake. This is due to the fact that the component 2 is fixedly secured to the rotary member 5 and its position need not be adjusted when an attendant decides to change the width of the air gap 11. Furthermore, the screws 12 are readily accessible at the exterior of the member 10, i.e., at the exterior of the collar 10A.

Figure 3:
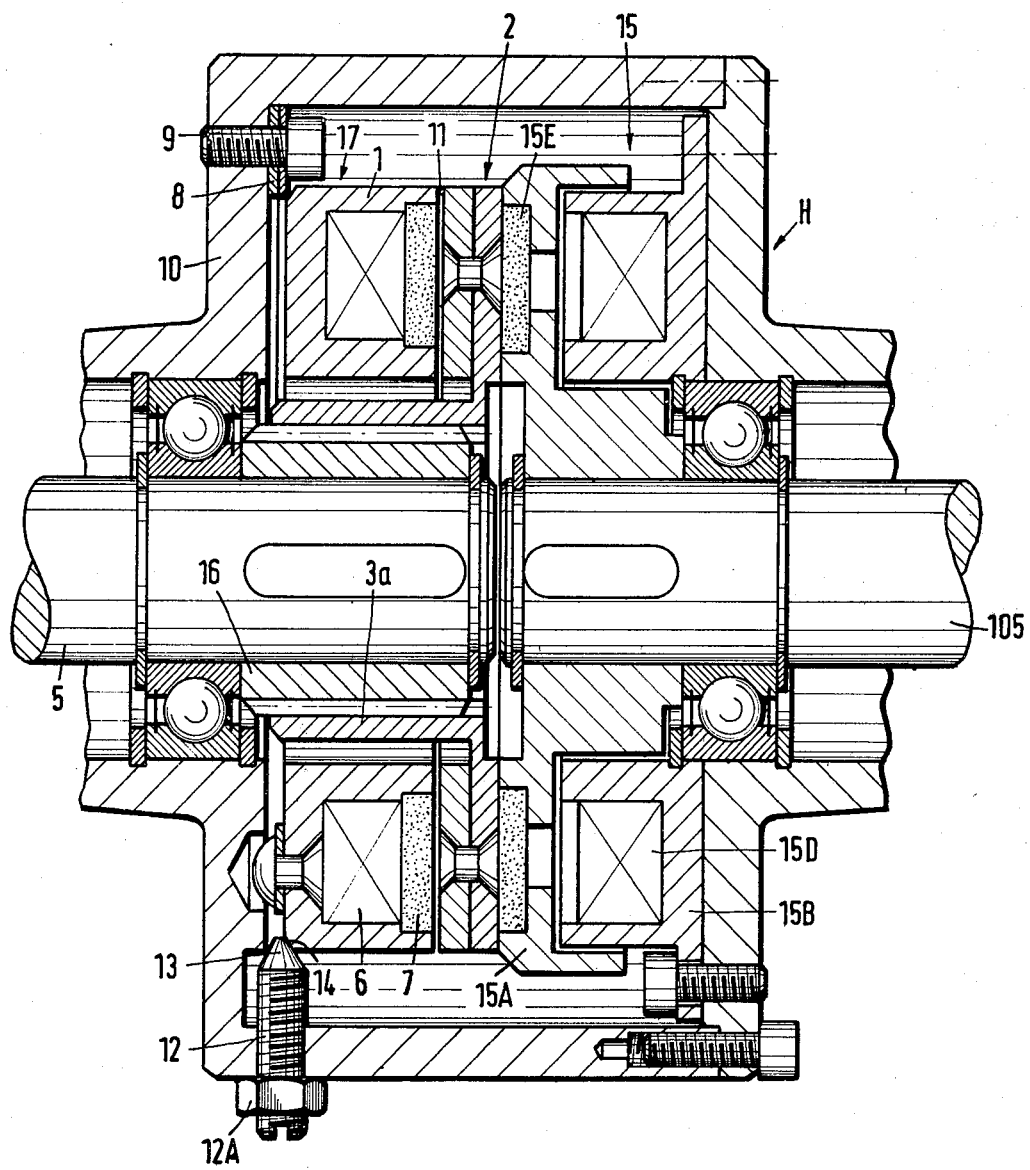
FIG. 3 is an axial sectional view of a combination of an electromagnetic brake which embodies the invention with an electromagnetic clutch.

FIG. 3 illustrates an electromagnetic brake which is similar to the brake of FIGS. 1-2 and is combined with an electromagnetic clutch 15 which serves to transmit torque from the rotary component 2 of the brake to a shaft 105 which is mounted in a housing H of a machine coaxially with the rotary member 5. The clutch 15 comprises a rotary portion 15A which is keyed to the shaft 105 and is rotated by the component 2 when the brake is disengaged and when a solenoid 15D in the stationary portion 15B of the clutch 15 is energized to urge the rotary component 2 against the adjacent surface of a liner 15E in the rotary portion 15A.

In contrast to the brake of FIGS. 1 and 2, the rotary component 2 of the brake of FIG. 3 is held against rotation with respect to, but is movable axially of, the rotary member 5. The latter is surrounded by and fixedly secured to a tubular element or sleeve 16 which is a long gear having an annulus of external teeth or splines in mesh with internal teeth or splines of the hub 3a of the rotary component 2. The teeth or splines of the sleeve 16 confine the component 2 to movements axially of the rotary member 5, the direction of axial movement depending upon whether the operator decides to engage the brake or the clutch.

The component 17 is mounted in the member 10 in the same way as described in connection with FIGS. 1 and 2, i.e., by means of a polygonal array of leaf springs 8 whose median portions are riveted to the support 1 and whose end portions are secured to the member 10 by screws 9 or analogous fastener means. The means for adjusting the width of the air gap 11 between the components 2 and 17 is also identical with the corresponding adjusting means of FIGS. 1 and 2, i.e., the screws 12 can be rotated to move their conical tips 13 radially inwardly and to thus shift the component 17 in a direction to the right, as viewed in FIG. 3, namely in a direction to reduce the width of the air gap 11. Such adjustment of the width of the air gap 11 can be carried out without any dismantling of the brake and/or clutch. This is due to the fact that the width of the air gap 11 can be adjusted while the positions of portions of the clutch remain unchanged. As mentioned above, conventional combinations of electromagnetic brakes and clutches are constructed in such a way that each adjustment of the width of the air gap between the components of the brake necessitates an appropriate adjustment of the air gap between the elements of the clutch.

Figure 4:
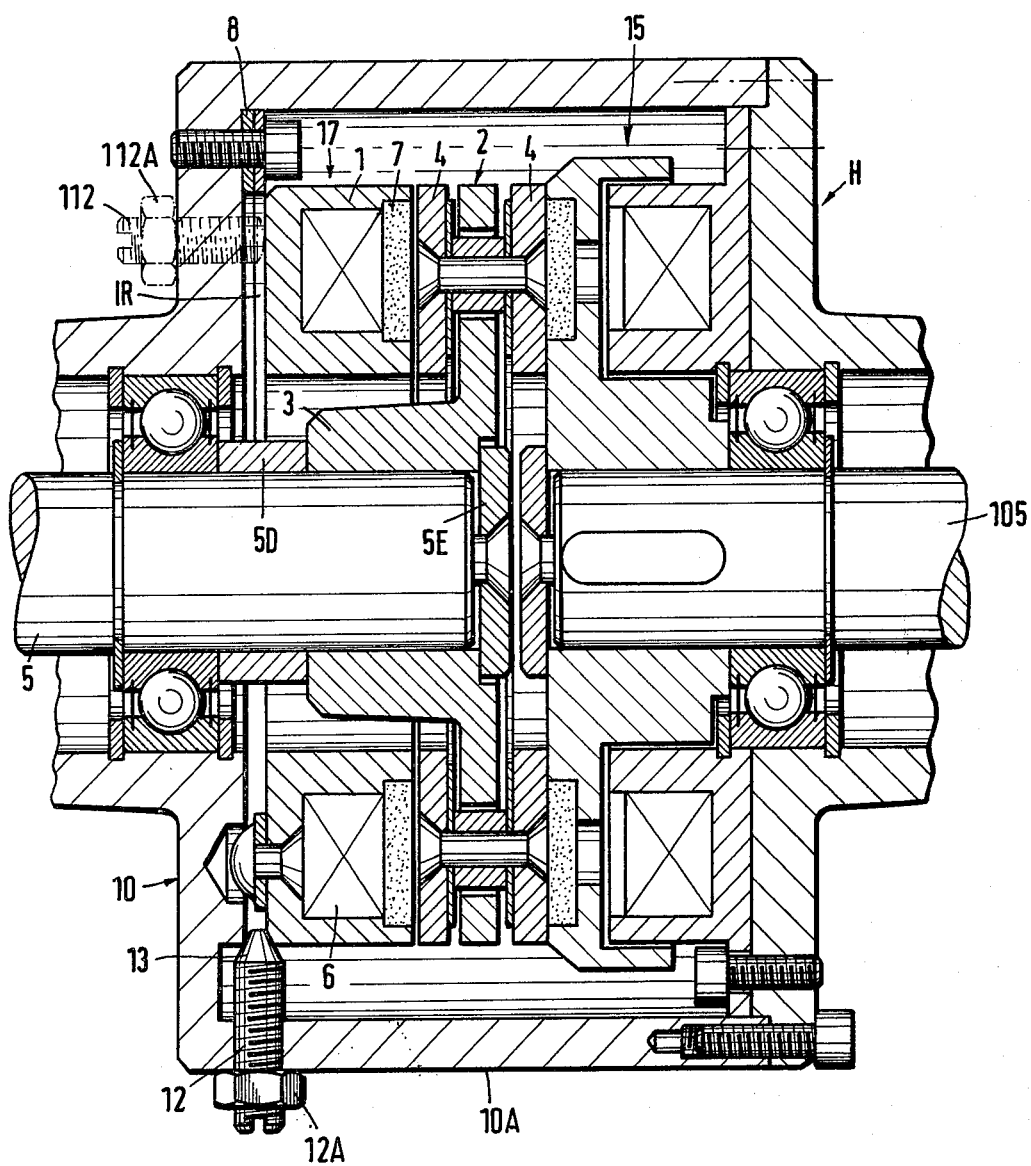
FIG. 4 is a similar sectional view of a modified combination of the improved brake with an electromagnetic clutch.

FIG. 4 shows a modified combination of an electromagnetic brake and an electromagnetic clutch. The difference between the combinations of FIGS. 3 and 4 is that the hub 3 forming a part of the rotary component 2 of the brake shown in FIG. 4 is held against axial and angular movement with respect to the rotary member 5 by parts 5D, 5E. The disks 4 of the component 2 are movable axially of the hub 3. The advantages of such construction are similar to those of the previously described embodiments.

FIG. 4 further shows that the means for adjusting the width of the air gap need not include adjusting members or screws which extend radially of the component 2. In this embodiment, the adjusting means comprises adjusting members or screws 112 (only one shown) which are parallel to the axis of the rotary member 5 and whose inner end portions or tips engage the rear side or surface 1R of the support 1. The screws 112 and the corresponding nuts 112A are indicated by phantom lines because they can be used in addition to or as substitutes for the screws 12 and nuts 12A. The screws 112 have rounded tips. In order to reduce the width of the air gap, the operator rotates the screws 112 in a direction to move them axially toward the clutch 15. Such screws 112 will be utilized when the rear side of the member 10 of the housing H is more readily accessible than the exterior of the collar 10A.

The improved brake (or a combination of the brake with a clutch) is susceptible of many additional modifications. For example, the adjusting means including the screws 12 and/or 112 can be replaced with wedge-like adjusting elements which are reciprocable in the collar 10A and can move their inclined surfaces into engagement with the rear side or surface 1R of the support 1 to move the latter toward the rotary component 2. The wedges can be provided with graduations to facilitate determination of the extent of their penetration into the interior of the collar 10A and hence the freshly selected width of the air gap. Furthermore, the springs 8 can be replaced with coil springs, e.g., with coil springs mounted in a manner as shown in FIG. 3 of the aforementioned copending application Ser. No. 652,538 of Brinkmann et al. Such springs react against the heads of suitable screws or bolts and bear against a flange of the support 1 to urge the latter in a direction to disengage the brake. Still further, the polygonal array of leaf springs 8 can be replaced with a single (one-piece) polygonal leaf spring having spaced-apart portions which are alternately connected to the stationary member 10 of the machine and to the support 1. Instead of using a polygonal leaf spring or a polygonal array of several leaf springs, the coupling means between the reciprocable (non-rotating) component 17 of the brake and the stationary member 10 may comprise a ring-shaped or oval spring which has alternating portions respectively riveted or otherwise secured to the member 10 and to the support 1. Another configuration which can be resorted to is a star-shaped array of leaf springs or a single (one-piece) star-shaped leaf spring.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A device for braking a first member which is rotatable with respect to a stationary second member, particularly a brake for a shaft which is rotatable with respect to a stationary part of a machine, comprising a first component; means for securing said first component to said first member so that the first component shares all angular movements of said first member; a second component adjacent said first component; means for nonrotatably coupling said second component to said second member with freedom of movement in the axial direction of said first component, including a polygonal array of elongated leaf springs having median portions secured to said second component and end portions, and means for fastening said end portions to said second member; and means for adjusting said second component with respect to said second member in said axial direction, said adjusting means being accessible at the exterior of said second member.

2. The device of claim 1, wherein said coupling means comprises means for biasing said second component away from said first component and said adjusting means comprises means for moving said second component toward said first component against the opposition of said biasing means.

3. The device of claim 1, wherein said adjusting means comprises adjusting members mounted in said second member for movement substantially radially of said first component and having cam faces engaging said second component.

4. The device of claim 3, wherein said adjusting members have external threads and mesh with said second member, said adjusting members including tips having conical surfaces which constitute said cam faces.

5. The device of claim 3, wherein said second component has a face complementary to and engaged by said cam faces.

6. The device of claim 1, wherein said adjusting means comprises adjusting members mounted in said second member for movement in substantial parallelism with the axis of said first component and having portions engaging said second component.

7. The device of claim 6, wherein said second component has a side facing away from said first component and said adjusting members are externally threaded and mesh with said second member, said portions of said adjusting members being movable into engagement with said side of said second component in response to rotation of said adjusting members with respect to said second member.

8. The device of claim 1, wherein said securing means includes means for holding said first component against movement in the axial direction of said first member.

9. The device of claim 1, wherein said securing means includes means for confining said first component to movements in the axial direction of said first member.

10. The device of claim 1, wherein said first component comprises a first portion and a second portion movable with respect to said first portion in the axial direction of said first member, said securing means including means for holding said first portion against movement in the axial direction of said first member.

11. The device of claim 1, wherein said polygonal array is a square and the end portions of neighboring leaf springs overlap each other and have registering holes for said fastening means.

* * * * *